United States Patent
Podbielski et al.

(10) Patent No.: US 11,170,931 B2
(45) Date of Patent: Nov. 9, 2021

(54) SYSTEM FOR AN INDUCTIVE ENERGY TRANSMISSION FROM A PRIMARY-CONDUCTOR SYSTEM TO A VEHICLE HAVING A SECONDARY WINDING

(71) Applicant: SEW-EURODRIVE GMBH & CO. KG, Bruchsal (DE)

(72) Inventors: Leobald Podbielski, Karlsruhe (DE); Jochen Mahlein, Karlsruhe (DE); Thomas Uhl, Bruchsal (DE); Andreas Böser, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 701 days.

(21) Appl. No.: 15/744,748

(22) PCT Filed: Jun. 16, 2016

(86) PCT No.: PCT/EP2016/001001
§ 371 (c)(1),
(2) Date: Jan. 12, 2018

(87) PCT Pub. No.: WO2017/008875
PCT Pub. Date: Jan. 19, 2017

(65) Prior Publication Data
US 2018/0211770 A1    Jul. 26, 2018

(30) Foreign Application Priority Data
Jul. 16, 2015 (DE) .................. 10 2015 009 074.7

(51) Int. Cl.
*H01F 38/14* (2006.01)
*H01F 27/42* (2006.01)
(Continued)

(52) U.S. Cl.
CPC ............. *H01F 38/14* (2013.01); *H01F 27/42* (2013.01); *H02J 50/12* (2016.02); *B60L 5/005* (2013.01);
(Continued)

(58) Field of Classification Search
CPC .......... H01F 38/14; H01F 27/42; B60L 53/12; B60L 5/005; H02J 50/12
See application file for complete search history.

(56) References Cited

U.S. PATENT DOCUMENTS 5,656,985 A * 8/1997 Lu ..................... H01F 27/027
174/561
6,005,304 A * 12/1999 Seelig ..................... H02J 5/005
307/104
(Continued)

FOREIGN PATENT DOCUMENTS

| CA | 2 403 762 A1 | 9/2002 |
|---|---|---|
| CN | 102388530 A | 3/2012 |

(Continued)

OTHER PUBLICATIONS

International Preliminary Report on Patentability issued in international patent application No. PCT/EP2016/001001, dated Jan. 16, 2018 (12 pages total).

(Continued)

*Primary Examiner* — Rexford N Barnie
*Assistant Examiner* — Thai H Tran
(74) *Attorney, Agent, or Firm* — Carter DeLuca & Farrell LLP

(57) ABSTRACT

In a system for an inductive energy transmission from a primary-conductor system, in particular a stationary primary conductor system, to a vehicle having a secondary winding, the secondary winding is inductively coupled with the primary-conductor system. The primary conductor is (Continued)

installed as a primary-conductor loop installed in elongated form, which has a feed conductor and a return conductor in a line section, in particular a return conductor that is installed parallel thereto, and the return conductor is electrically grounded in that at least one inductance is disposed between the return conductor and the electrical ground.

22 Claims, 2 Drawing Sheets

(51) Int. Cl.
  *H02J 50/12*   (2016.01)
  *B60L 5/00*   (2006.01)
(52) U.S. Cl.
  CPC ............ *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

2003/0201862 A1* 10/2003 Arntz ................. B60L 5/005
                336/174

2014/0035389 A1* 2/2014 Ngahu ................. H01F 38/14
                307/104

FOREIGN PATENT DOCUMENTS

| CN | 104205264 A | 12/2014 | | |
|---|---|---|---|---|
| DE | 44 46 779 A1 | 6/1996 | | |
| DE | 100 14 954 A1 | 10/2001 | | |
| DE | 102006006384 A1 | * 9/2006 | ............. | B60L 5/005 |
| WO | 96/20526 A1 | 7/1996 | | |
| WO | 2005020405 A1 | 3/2005 | | |
| WO | 2008/031491 A1 | 3/2008 | | |
| WO | WO-2008031491 A1 | * 3/2008 | ............. | H02J 50/10 |

OTHER PUBLICATIONS

International Serach Report dated Sep. 2, 2016, in International Application No. PCT/EP2016/001001 (English-language translation).

Schloeder EMC Systems and Components—"Protective Conductor Chokes"—Technical datasheets dated Sep. 15, 2014. Retrieved from <http://www.schloeder-emv.de/emv-produkte/emv-bauelemente/ netzfilter-stoerschutz-bauteile/induktive-bauelemente/drossel-schutzleiter.html>.

* cited by examiner

SYSTEM FOR AN INDUCTIVE ENERGY TRANSMISSION FROM A PRIMARY-CONDUCTOR SYSTEM TO A VEHICLE HAVING A SECONDARY WINDING

FIELD OF THE INVENTION

The present invention relates to a system for an inductive energy transmission from a primary-conductor system to a vehicle having a secondary winding.

BACKGROUND INFORMATION

It is generally known that an alternating current is able to be applied to a primary-conductor system in inductive energy transmissions and that electrical energy can thereby be transmitted to a secondary winding that is provided to be inductively coupled with the primary-conductor system.

SUMMARY

Example embodiment of the present invention provide a system for an inductive energy transmission from a primary-conductor system to a vehicle having a secondary winding while improving safety and reducing losses.

In a device and in a method according to example embodiments of the present invention, a system is provided for the inductive energy transmission from a primary-conductor system, in particular a stationary primary-conductor system, to a vehicle having a secondary winding. The secondary winding is inductively coupled with the primary-conductor system, and the primary conductor is arranged as a primary conductor loop, installed in elongated form, which has a feed conductor and a return conductor in a line section, in particular a return conductor installed in parallel thereto. The return conductor is electrically connected to ground in that at least one inductance is disposed between the return conductor and the electrical ground.

This is considered advantageous because a simple ground connection for low-frequency currents is implemented, but no dissipation to ground is induced for medium-frequency currents. As a result, the medium-frequency currents stay in the system and may be exploited for an inductive energy transmission to the vehicle.

The primary-conductor loop may have a plurality of line sections, each having a feed conductor and a return conductor. This has the advantage that multiple line sections may be formed and multiple vehicles are thus able to be inductively supplied at the same time.

The return conductor, in particular the respective return conductor, may be arranged as an outer conductor, and the feed conductor, in particular the respective feed conductor, may be arranged as an inner conductor. This has the advantage that the outer conductor is connected to ground, at least for low-frequency current components, which results in greater safety.

The inductance may be dimensioned such that it induces an impedance for the supply frequency, i.e. in particular for a frequency of 50 Hz or 60 Hz, that is at least one hundred times, and especially one thousand times lower. This is considered advantageous because a ground connection is established for low frequencies, and no current components are able to dissipate to ground for high or medium frequencies.

The return conductor, in particular the respective return conductor, may at least partially surround the feed conductor, in particular the respective feed conductor, in the circumferential direction, i.e. perpendicular to the direction of movement of the vehicle, e.g., such that a slot, extending in the direction of movement, is formed on the return conductor, in particular on the respective return conductor, the secondary winding in particular being provided around a U-shaped ferrite core, the legs of the U in each case projecting or extending into the space region between the feed conductor and the return conductor. This has the advantage that a high coupling factor is achievable in the inductive transmission because the U-shaped core nearly completely encloses the feed conductor in the circumferential direction. The U-shaped core has only a small extension in the conductive direction. As a result, the vehicle is able to be moved back and forth in the line section, and, in particular, also along curves given radii of corresponding sizes.

The return conductor, in particular the respective return conductor, may be arranged as an aluminum continuous casting profiled part, and the feed conductor, in particular the respective feed conductor, may be made of multistrand wire, in particular HF litz wire, and especially ribbon-type litz wire, the drawing direction of the continuous-casting part being aligned parallel to the direction of movement of the vehicle, in particular. This has the advantage of suppressing an emission of electromagnetic waves.

The vehicle may be arranged as a monorail train, in particular an overhead monorail train. This has the advantage of providing an uncomplicated conveyor system. A low-wearing operation is able to be achieved, in particular if a contact-free supply is provided.

The return conductors may be electrically connected to a series connection of inductances, a first connection of the series connection may be electrically with the housing of a feeder unit for the supply of a medium-frequency alternating current to the primary-conductor loop, and the housing may be electrically connected to ground, in particular electrically connected to the ground potential. This is considered advantageous because the housing is grounded, and the return conductors for low-frequency current components are grounded as well.

The inductances of the series connection may be identical, which is considered advantageous because of the simplified configuration.

The inductance may be dimensioned such that it represents a resistance for the medium-frequency current that is at least one hundred times, and in particular one thousand times greater than the resistance for the low-frequency current of the mains supply, i.e. a current having 50 Hz or 60 Hz. This offers the advantage of establishing grounding for low-frequency current components, i.e. also for direct-current components, but medium-frequency or high-frequency current components are unable to dissipate from the return conductor to ground.

Further features and aspects of example embodiments of the present invention are described in greater detail with reference to the Figures.

DETAILED DESCRIPTION

Figure 1:
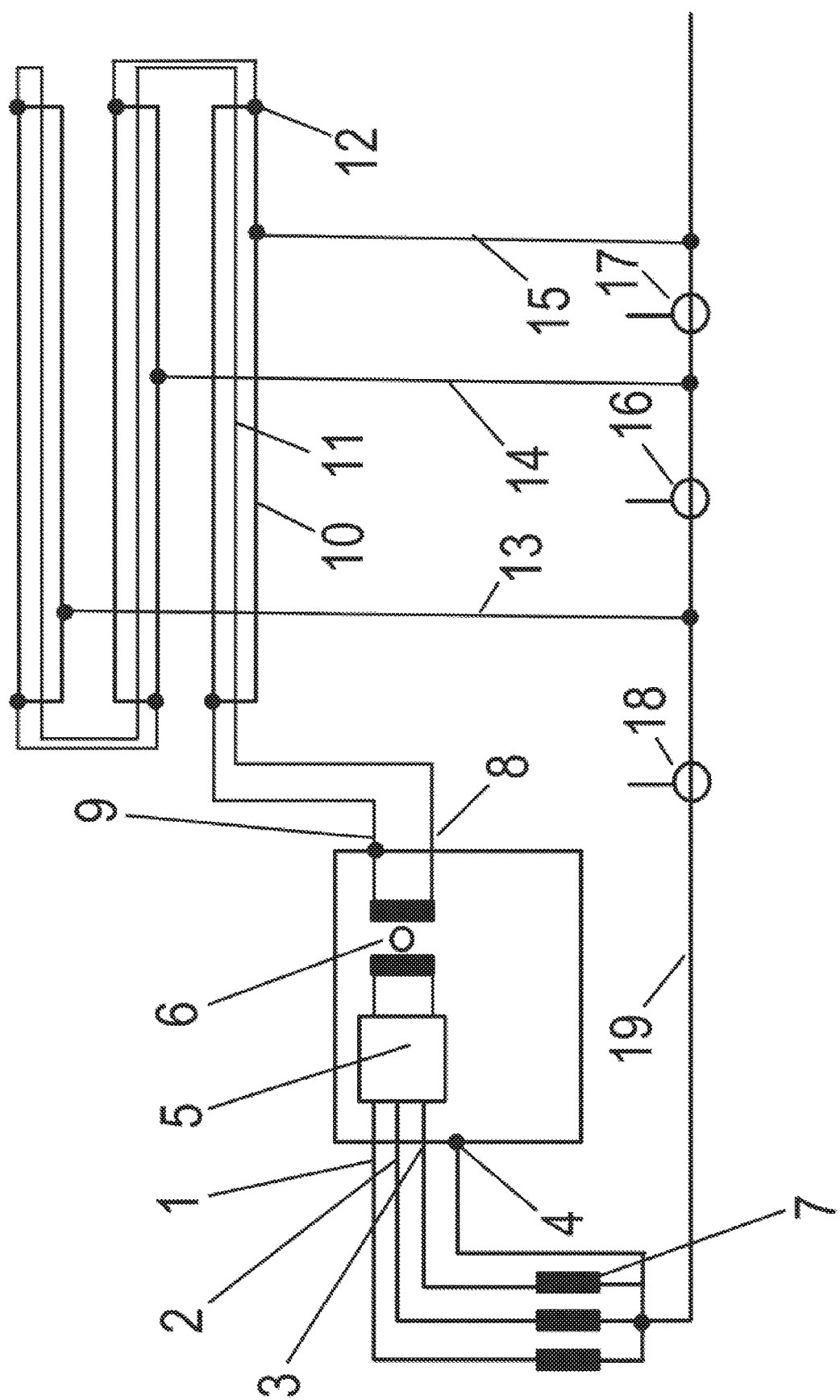
FIG. 1 shows a system for the inductive transmission of energy to, e.g., a mobile electrical consumer, wherein metallic outer conductors 10 are directly connected to ground 19, i.e. the ground potential of the system.

As illustrated in FIG. 1, a feeder unit, which is fixedly disposed in a system, is electrically supplied with the aid of three phases (L1, L2, L3), i.e. by a three-phase current system, from a local-grid transformer 7, which has star-point grounding.

The star point constitutes ground 19, in particular the ground potential of the system.

Local-grid transformer 7 is supplied from a public supply grid, which has a frequency of 50 Hz or 60 Hz, for example.

The feeder unit has a medium-frequency alternating current source, in particular an AC/AC converter, and the frequency of the generated alternating current is between 10 kHz and 1000 kHz.

The primary side of a transformer 6, whose secondary side supplies a primary-conductor loop installed in elongated form, is supplied from the alternating current source. This loop is composed of a feed conductor and a return conductor.

Transformer 6 has a connection 8 for the feed conductor, in particular the inner conductor, and a connection 9 for a return conductor, in particular an outer conductor.

Feed conductor 11 is implemented as high-frequency litz wire installed in elongated form and/or as a ribbon-type conductor.

Return conductor 10 is arranged as a continuous casting component, in particular an aluminum continuous casting component. For example, the cross-section is substantially U-shaped. The continuous casting direction or the drawing direction of the profile is aligned parallel to the extension direction of feed conductor 11 and return conductor 10. As a result, return conductor 10 at least partially surrounds feed conductor 11 transversely to the continuous-casting direction.

As illustrated in FIG. 1, the system has a plurality of line sections, in particular three line sections; a section of the feed conductor and of the return conductor is installed in each line section and these sections are electrically connected in series to one another.

A vehicle, which has a secondary coil that is inductively coupled with the primary conductor, is movable along a line section. The secondary coil includes a U-shaped core for this purpose, in particular a ferrite core, which at least partially surrounds feed conductor 11 and is at least partially surrounded by return conductor 10.

As a result, an inductive supply of a movable vehicle is able to be carried out.

Each return conductor 10 is electrically connected to ground 19 by a ground conductor (13, 14, 15). This makes it possible to achieve greater safety because each line section is grounded individually. Current-detection devices (16, 17, 18) are disposed in each current path allocated to the respective line section in order to detect the ground-fault currents. This makes it possible to detect a respective ground-fault current in each line section.

A capacitance is connected in series or in parallel to the secondary coil, so that the resonant frequency of the oscillating circuit formed in this manner corresponds at least in principle to the frequency of the alternating current impressed into the primary conductor. High efficiency in the inductive energy transmission is able to be achieved in this manner even if the existing inductive coupling is quite weak.

Figure 2:
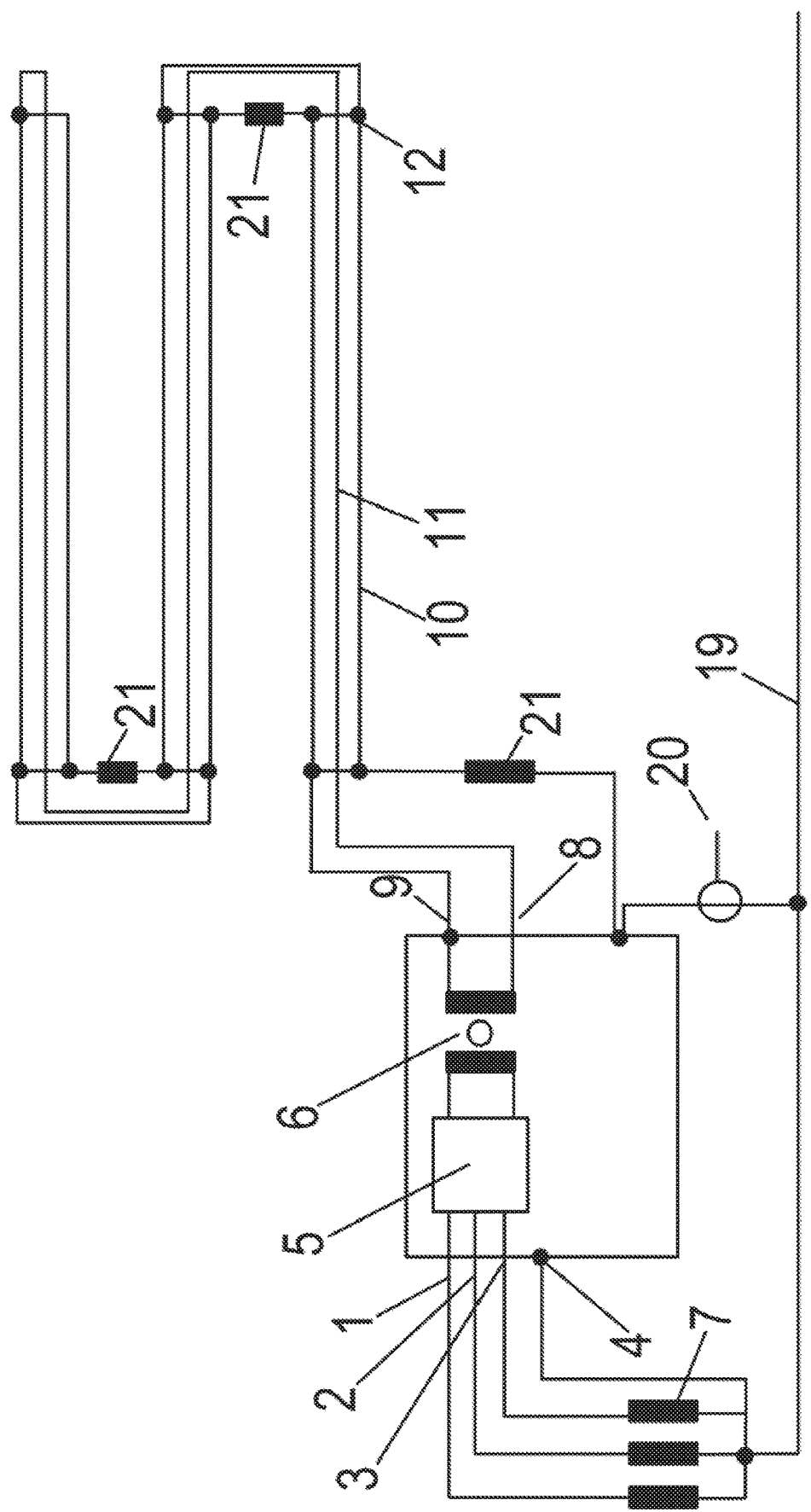
FIG. 2 shows a similar system in which the grounding is implemented via respective inductances.

In contrast to FIG. 1, not every return conductor 10 of each line section is directly connected to ground 19 in the exemplary embodiment according to FIG. 2, but inductances 21 are interposed instead.

As illustrated in FIG. 2, return conductor 10 of a first line section is connected to ground 19 by inductance 21. Return conductor 10 of a second line section is connected to return conductor 10 of the first line section with the aid of an inductance 21. Return conductor 10 of a third line section is also connected to the return conductor of the second line section by an inductance 21.

As a result, inductances 21 form a series connection, whose first connection is connected to ground 19 and whose nodes in each case are connected to a return conductor of a line section.

A current-detection device 20 is situated in the current path of the series connection, so that a ground-fault current is able to be detected.

The first connection is electrically connected to the metallic housing of the feeder unit, which therefore means that the feeder unit is also electrically grounded.

Because the current-detection device 20 is situated between the first connection and ground 19, the respective line section triggering the short to ground is unable to be identified. The ground-fault current of the system is therefore only detectable as a whole.

However, with the aid of inductances 21, a high resistance is made available for medium-frequency current components and a low resistance for low-frequency current components. As a result, grounding is effective for low-frequency currents but not for medium-frequency currents.

The inductance may be dimensioned such that it represents a resistance for the medium-frequency current that is at least one thousand times greater than the resistance for the low-frequency current of the power supply, i.e. a current having 50 Hz or 60 Hz.

LIST OF REFERENCE NUMERALS

1 First phase of the power supply
2 First phase of the power supply
3 First phase of the power supply
4 PE-connection of the feeder unit
5 Alternating current source, in particular medium-frequency alternating current source
6 Galvanic separation, in particular transformer
7 Local-grid transformer having star-point grounding
8 Connection of the feed conductor, in particular inner conductor
9 Connection of the return line, in particular outer conductor
10 Return conductor, in particular outer conductor
11 Feed conductor, in particular inner conductor
12 Electrical contact
13 Ground conductor
14 Ground conductor
15 Ground conductor
16 Current-detection device
17 Current-detection device
18 Current-detection device
19 Ground, in particular ground potential of the system
20 Current-detection device
21 Inductance

The invention claimed is:

1. A system for an inductive energy transmission from a primary-conductor system to a vehicle having a secondary winding, the secondary winding being inductively coupled with the primary-conductor system, comprising:
   a primary conductor of the primary-conductor system arranged as a primary-conductor loop installed in elongated form, having a feed conductor and a return conductor in a line section, the return conductor being electrically grounded, at least one inductance being disposed between the return conductor and an electrical ground;

wherein the primary-conductor loop includes a plurality of line sections, each line section having a feed conductor and a return conductor; and wherein the return conductors are electrically connected to a series connection of inductances.

2. The system according to claim 1, wherein the primary-conductor system is arranged as a stationary primary-conductor system.

3. The system according to claim 1, wherein the return conductor is arranged parallel to the feed conductor.

4. The system according to claim 1, wherein the return conductor is arranged as an outer conductor, and the feed conductor is arranged as an inner conductor.

5. The system according to claim 1, wherein the inductance is adapted to induce an impedance for a line frequency that is at least one hundred times.

6. The system according to claim 5, wherein the line frequency is 50 Hz or 60 Hz.

7. The system according to claim 1, wherein the inductance is adapted to induce an impedance for a line frequency that is at least one thousand times lower.

8. The system according to claim 1, wherein the return conductor at least partially surrounds the feed conductor in a circumferential direction and/or perpendicular to a direction of movement of the vehicle.

9. The system according to claim 8, wherein a slot, extending in the direction of movement, is formed on the return conductor.

10. The system according to claim 8, wherein the secondary winding is arranged around a U-shaped ferrite core, and each leg of the U projecting and/or extending into a space region between the feed conductor and the return conductor.

11. The system according to claim 1, wherein the return conductor is arranged as an aluminum continuous-casting profiled part, and the feed conductor is formed of multistrand cables, an HF litz wire, and/or a ribbon-type litz wire.

12. The system according to claim 11, wherein a drawing direction of the continuous-casting component being aligned parallel to a direction of movement of the vehicle.

13. The system according to claim 1, wherein the vehicle includes a monorail train and/or an overhead monorail train.

14. The system according to claim 1, wherein a first connection of the series connection is electrically connected with the housing of a feeder unit adapted to supply a medium-frequency alternating current to the primary-conductor loop, and the housing is electrically connected to ground and/or a ground potential.

15. The system according to claim 14, wherein the inductances of the series connection are identical.

16. The system according to claim 14, wherein the inductance is arranged as a resistance for the medium-frequency current that is at least one hundred times and/or one thousand times higher than a resistance for a low-frequency current of the power supply.

17. The system according to claim 16, wherein the low-frequency current of the power supply includes a 50 Hz and/or 60 Hz current.

18. The system according to claim 1, further comprising a capacitance connected to the secondary winding in parallel or in series such that a resonant frequency of a resulting oscillating circuit formed substantially corresponds to a frequency of an alternating current impressed into the primary conductor.

19. The system according to claim 1, wherein the inductance includes a ring core fixed in place and/or mounted on a rail.

20. The system according to claim 19, wherein the inductance provides an excellent medium-frequency conductance, through which a protective conductor is routed multiple times.

21. The system according to claim 19, wherein the ring core is formed of ferrite.

22. A device, comprising:
a primary-conductor system;
a vehicle including a secondary winding; and
a system adapted to inductively transmit energy from the primary-conductor system to the vehicle, the secondary winding is inductively coupled with the primary-conductor system, a primary conductor of the primary-conductor system arranged as a primary-conductor loop installed in elongated form, having a feed conductor and a return conductor in a line section, the return conductor being electrically grounded in that at least one inductance is disposed between the return conductor and an electrical ground;

wherein the primary-conductor loop includes a plurality of line sections, each line section having a feed conductor and a return conductor; and wherein the return conductors are electrically connected to a series connection of inductances.

* * * * *